United States Patent [19]

Kobayashi

[11] Patent Number: 4,529,070
[45] Date of Patent: Jul. 16, 1985

[54] SYSTEM FOR ACTUATING A CLUTCH FOR A TORQUE CONVERTER

[75] Inventor: Toshio Kobayashi, Mitaka, Japan

[73] Assignee: Fuji Jukogyo Kabushiki Kaisha, Tokyo, Japan

[21] Appl. No.: 417,968

[22] Filed: Sep. 14, 1982

Related U.S. Application Data

[63] Continuation of Ser. No. 201,662, Mar. 25, 1980, abandoned.

[30] Foreign Application Priority Data

Nov. 20, 1978 [JP] Japan ................................. 53-143072
Nov. 20, 1978 [JP] Japan ................................. 53-143073

[51] Int. Cl.³ .............................................. F16D 39/00
[52] U.S. Cl. .................................. 192/3.23; 192/3.3; 192/3.31; 192/3.33
[58] Field of Search ................. 192/3.3, 3.31, 3.23, 192/3.24, 3.28, 3.29, 3.33

[56] References Cited

U.S. PATENT DOCUMENTS

| | | | |
|---|---|---|---|
| 2,630,895 | 3/1953 | McFarland | 192/3.3 X |
| 2,707,887 | 5/1955 | Slack | 192/3.3 |
| 2,728,427 | 12/1955 | Lucia | 192/3.3 X |
| 2,736,412 | 2/1956 | Livezey | 192/85 |
| 2,824,632 | 2/1958 | Lucia et al. | 192/3.31 X |
| 2,903,910 | 9/1959 | Carnegie | 192/3.3 |
| 2,965,202 | 12/1960 | Christenson | 192/3.3 |
| 2,969,131 | 1/1961 | Black et al. | 192/3.3 X |
| 3,001,415 | 9/1961 | Smirl | 192/3.33 X |
| 3,336,815 | 8/1967 | Leonard | 74/752 C X |
| 3,566,998 | 3/1971 | Honda et al. | 192/3.3 |
| 3,693,478 | 9/1972 | Malloy | 192/3.31 X |
| 3,714,836 | 2/1973 | Pierce et al. | 74/752 C |
| 3,949,847 | 4/1976 | Hoehn | 192/3.3 |
| 3,985,046 | 10/1976 | Morris et al. | 192/3.31 X |
| 4,033,436 | 7/1977 | Hoetger et al. | 192/3.3 |
| 4,051,932 | 10/1977 | Arai et al. | 192/3.3 |
| 4,095,486 | 6/1978 | Ohnuma | 192/3.29 X |
| 4,289,048 | 9/1981 | Mikel et al. | 192/3.33 |

*Primary Examiner*—Rodney H. Bonck
*Attorney, Agent, or Firm*—Martin A. Farber

[57] ABSTRACT

A system for actuating, in a torque converter for an automotive vehicle, a fluid operated clutch for directly coupling an impeller of a torque converter with the turbine in a predetermined driving condition. Line pressure applied to a band servo of the brake band in the automatic transmission for the torque converter is used for actuating oil for the fluid operated clutch, and a control valve is provided in the pressure oil circuit controlled by a governor pressure. The control valve is so arranged that a port of the valve is opened to apply the line pressure to the clutch to couple the impeller with the turbine when the speed of the vehicle exceeds a predetermined mined valve.

2 Claims, 4 Drawing Figures

SYSTEM FOR ACTUATING A CLUTCH FOR A TORQUE CONVERTER

This is a continuation of application Ser. No. 201,662, filed Mar. 25, 1980, and now abandoned.

TECHNICAL FIELD

The present invention relates to a torque converter for an automotive vehicle, and more particularly to means for actuating a clutch attached to the torque converter.

BACKGROUND ART

In order to decrease the power loss of the torque converter and to improve the driveability and fuel comsumption of the automobile, a fluid operated clutch for directly coupling the impeller of the torque converter to the turbine under a predetermined driving condition is generally used.

Such a clutch for directly connecting the impeller with the turbine is so arranged that a clutch facing is pressed against a clutch disk by pressure oil introduced into a pressure oil chamber provided in the clutch. In a conventional clutch system, governor pressure which is produced by a governor valve in proportion to the speed of the vehicle is applied to the pressure oil chamber. The clutch system is so arranged that, when the governor pressure exceeds a predetermined level, the clutch facing is pressed against the clutch disk by the governor pressure. However, since the governor pressure is not sufficient to operate a conventional clutch, the clutch must be designed to be operated by the governor pressure. For example, the clutch facing is constructed by a plurality of plates or a pressure oil chamber having a great volume is provided. Therefore, the size of the clutch must be increased, which requires a large space for installing the clutch.

The present invention as its object provides a system which can remove the disadvantage in the conventional torque converter system.

DISCLOSURE OF THE INVENTION

To this end, the system according to the present invention is characterized in that line pressure applied to a band servo of a brake band in an automatic transmission for the torque converter is used for actuating oil for a fluid operated clutch for directly coupling an impeller of a torque converter with a turbine, a control valve being provided in a pressure oil circuit controlled by a governor pressure. The control valve is so arranged that a port of the valve is opened to apply the line pressure to the clutch to couple the impeller with the turbine, when the speed of the vehicle exceeds a predetermined value.

BEST MODE FOR EMBODYING THE INVENTION

Figure 1:
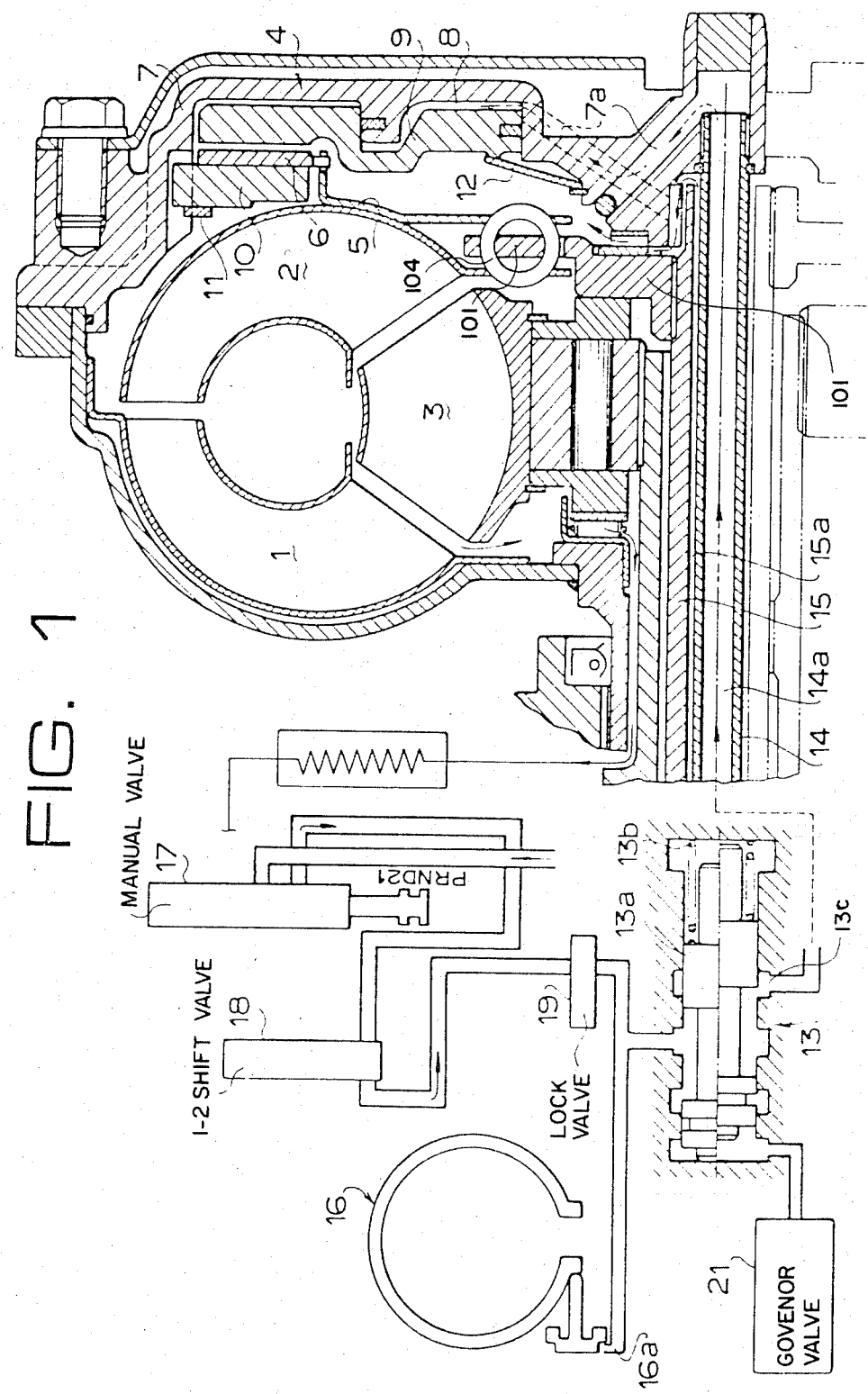
FIG. 1 is a sectional view partly broken away showing an embodiment of the present invention.

Referring to FIG. 1 showing the first embodiment, there is illustrated an impeller 1 of a fluid operated torque converter, a turbine 2 cooperating therewith by fluid communication, a stator 3 and a clutch 4 installed on the front side of the torque converter. The clutch comprises a clutch disk-supporting member 5, a clutch disk 6 mounted axially slidably on the member 5 but so as to be prevented from rotating about the member 5, a pressure oil chamber 8 formed in a cover 7 secured to the impeller 1, a piston 9 mounted on the inner wall of the cover 7 so as to be axially slidable relative thereto and a pressure plate 10 axially slidably engaged with a spline formed in the inner wall of the cover 7 and secured by a clip 11.

The clutch disk-supporting member 5 is welded to the arcuate back side of the turbine 2. A hub 101 is jointly rotatably connected to the turbine shaft 15 and has a radially outermost extending portion disposed closely spaced from and between radially innermost ends of the supporting member 5 and the turbine 2, which are operatively connected together by rings 104 engaging these members in a circumferential direction. The piston 9 is moved against a clutch spring 12 by the pressure oil supplied to the pressure oil chamber 8 and presses the clutch disk 6 against the pressure plate 10, in order to connect the impeller 1 to the turbine 2.

The pressure oil chamber 8 communicates with a control valve 13 through a conduit 7a and a conduit 14a formed in an oil pump drive shaft 14, so that the line pressure in the control circuit of the automatic transmission may be supplied to the chamber as described hereinafter.

Pressure oil for the torque converter (including lubricant oil) is supplied to the turbine 2 through a conduit 15a between the oil pump drive shaft 14 and a turbine shaft 15 coaxial with the shaft 14 and further supplied to lubricating portions from the impeller 1 through an oil cooler. The turbine shaft 15 is connected to the turbine 2 and a forward clutch (not shown).

The above described torque converter is connected to an automatic transmission device. In accordance with the present invention, pressure oil (line pressure) applied to a band servo of a brake band 16 of the automatic transmission device is applied to the pressure oil chamber 8 through the control valve 13 and the conduits 14a and 7a. More particularly, the line pressure, regulated by a pressure regulator valve (not shown), is applied to the apply side (application side) 16a of the band servo through a manual valve 17, a 1-2 shift valve 18 and a second lock valve 19 in each range of $D_2$, $D_3$, kick-down, 2 and $1_2$, which is a well known system in itself. The line pressure to the apply side 16a also is applied to the control valve 13. Depending on the speed of the vehicle, a governor pressure is produced by a governor valve 21 and this pressure is applied to the end chamber (left-hand chamber in FIG. 1) of the control valve 13.

In operation, this 1-2 shift valve 18 is positioned in the last speed side during first speed driving. Accordingly, the pressure oil is not applied to the apply side 16a of the band servo, so that no pressure is applied to the control valve 13. In the second speed driving, the 1-2 shift valve 18 is shifted to this second speed side. Thus, the line pressure is applied to the apply side 16a through the second lock valve 19. When the speed of the vehicle is lower than a predetermined level, the governor pressure from the governor valve is low. Accordingly, the spool 13a of the control valve 13 is shifted to the left by a spring 13b to close a port 13c of the control valve as shown by the position of the upper half of the spool 13a in the illustration of FIG. 1. When the speed of the vehicle reaches a predetermined level $V_1$ shown in FIG. 2, the governor pressure exceeds a predetermined level, so that the spool 13a is shifted to the right against the spring 13b to open the port 13c as shown in the lower half of the spool in FIG. 1 of the drawings. Thus, the line pressure is applied to the pressure oil chamber 8 through the control valve 13 and conduit 14a to push the piston 9 against the clutch disk 6, such that the clutch disk 6 is pressed against the pressure plate 10. By the engagement of this clutch 4, the turbine 2 is directly coupled with the impeller 1.

Figure 2:
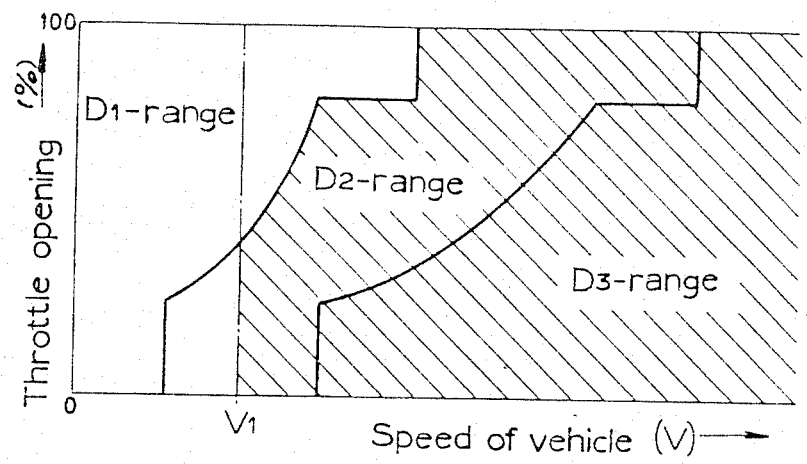
FIG. 2 is a graph showing an operational range of a clutch in the embodiment.

The operational range of the clutch 4 for directly coupling the torque converter is shown in FIG. 2 by hatching, which is in the range in the $D_2$-range over the predetermined speed $V_1$ and in the entire $D_3$-range.

In this embodiment, since the line pressure applied to the apply side of the band servo is used for the pressure oil for the clutch 4 and is supplied to the clutch under the control of the governor pressure according to the speed of the vehicle, the clutch is operated in the second speed over a predetermined speed and in the 3RD speed. If the clutch were engaged in the 2ND gear condition when starting the vehicle, the engine would stall due to the heavy load. In accordance with the system of the present invention it is possible to prevent the engine from stalling when starting in the 2ND gear, because the clutch is not engaged at low speeds below the predetermined speed.

Figure 3:
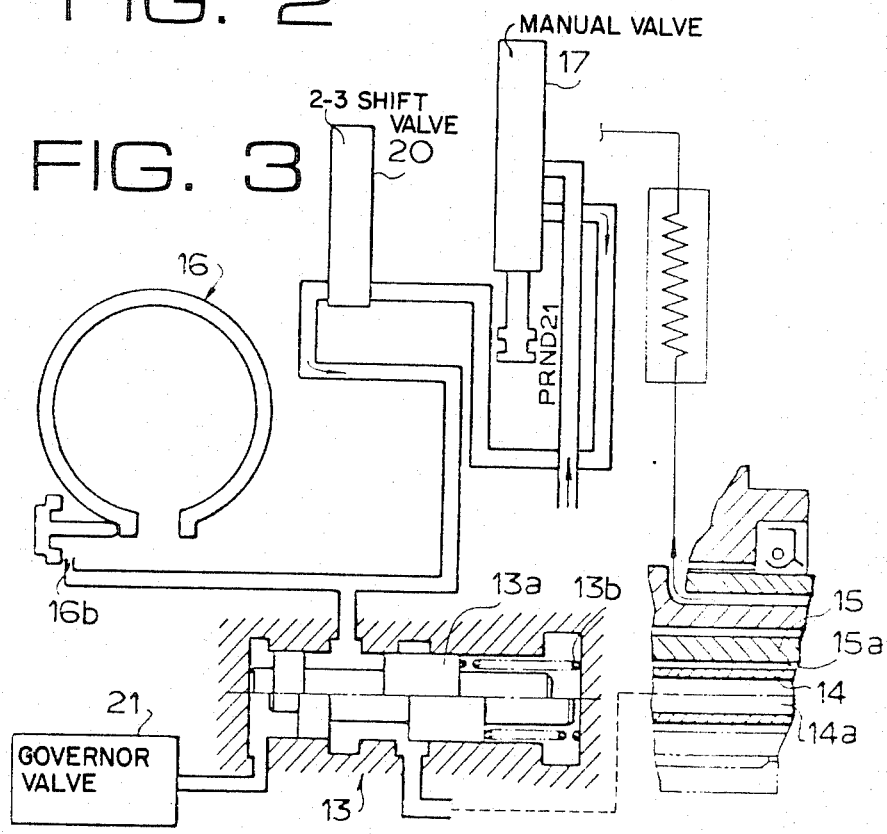
FIG. 3 shows another embodiment of the present invention in a broken away sectional view.

FIG. 3 shows the second embodiment of the present invention, in which the torque converter and the clutch are omitted, because these are the same as the first embodiment. The same parts as the first embodiment are identified with the same numerals as those of FIG. 1 respectively. In this embodiment, the line pressure supplied to the release side 16b of the band servo for the brake band 16 is applied to the pressure oil chamber of the clutch through the control valve 13. More particularly, the line pressure regulated by the pressure regulator valve (not shown) is applied to the release side 16b through the manual valve 17 and 2-3 shift valve 20 in the "R" (reverse) range and $D_3$ range and also applied to the control valve 13. In the first speed and the second speed driving, the 2-3 shift valve 20 is in the second speed position, so that the line pressure is not applied to the release side 16b and the control valve 13. In the third speed, since the 2-3 shift valve 20 is shifted to the third speed side, the line pressure is applied to the release side 16b. Further, the line pressure is applied to the pressure oil chamber of the clutch through the control valve 13 and the conduit 14a to actuate the clutch to directly couple the torque converter.

Figure 4:
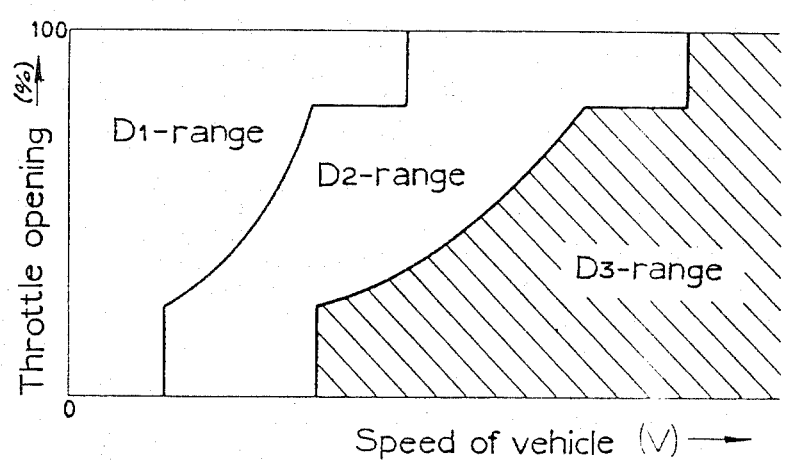
FIG. 4 is a graph showing an operational range of the last embodiment.

In the reverse range, the line pressure is also applied to the release side 16b. However, since the governor pressure does not build up in the reverse range, the speed 13a is in the upper half position in FIG. 3 to close the port, 13c, and the line pressure is not applied to the clutch. The operational range of the clutch is in the $D_3$-range as shown in FIG. 4.

From the foregoing, it will be understood that it is possible to eliminate the power loss due to slip in the torque converter by coupling the impeller with the turbine in the high reduction ratio range, whereby the fuel consumption and engine brake effect can be improved. Since line pressure much higher than the governor pressure is used for operating the clutch to directly couple the torque converter, it is possible to reduce the volume of the pressure oil chamber of the clutch and/or area of the clutch face subjected to the pressure oil thereby to decrease the size and weight of the device. Further, since the clutch is operated in the second speed over a predetermined speed, it is possible to prevent the engine from stalling during starting in 2ND gear. Since the conduit 14a for the pressure oil from the control valve 13 to the clutch 4 is provided in the oil pump drive shaft 14 as shown in the illustrated embodiments, the system can be constructed with a small size. It will be understood that any other pressure oil circuits and other type of clutches may be employed in the system of the present invention.

I claim:

1. In a system for actuating a torque converter used for an engine and an automatic transmission connected to the engine for a vehicle, said transmission having a 1-2 shift valve, a 2-3 shift valve, and a lock-up clutch for coupling a turbine of the torque converter to a cover of the torque converter in a lock-up condition of the lock-up clutch, a turbine shaft being connected to the turbine, the lock-up clutch including a piston slidably mounted in the cover for actuating the lock-up clutch into the lock-up condition, a passage communicating a chamber defined by the piston and the cover, conduits connected to said shift valves, respectively, for applying pressure fluid therefrom to a band servo of a brake band of the transmission depending on respective speed side positions of said shift valves for providing a $D_1$ range, $D_2$-range and $D_3$-range, an oil pump operatively connected to said conduits via said shift valves, and a governor valve producing a governor pressure dependent on the vehicle speed, the improvement wherein said lock-up clutch further includes, a clutch disc supporting member being secured directly on a back side of said turbine, a clutch disc adjacent said piston being supported axially slidably and non-rotatably on said clutch disc supporting member, and a pressure plate being secured to said cover adjacent said clutch disc, means comprising an oil pump drive shaft disposed in the turbine shaft for driving the oil pump, said oil pump drive shaft forms therein a drive shaft passage which constitutes a part of said first-mentioned passage communicating with said chamber, a control valve having a spool, constituting means for being shifted by said governor pressure, and having a port connected to one of said conduits for applying pressure fluid to said band servo and another port communicating with said first-mentioned passage including said drive shaft passage for said lock-up clutch, an output of said 1-2 shift valve via said one of said conduits being connected to an apply side of said band servo, said control valve constituting means for communicating both said ports when said governor pressure exceeds a predetermined value for actuating said lock-up clutch in the lock-up condition via said pressure fluid when applied to said band servo from said one of said conduits, said predetermined value of the governor pressure corresponding to a vehicle speed within the $D_2$- range when a throttle valve of the engine is positioned at a closed position and a partial opening position, so as to eliminate power loss due to slipping in the torque converter by coupling the impeller with the turbine in the high reduction ratio range, whereby fuel consumption and engine brake effect may be improved.

2. In a system for actuating a torque converter used for an engine and an automatic transmission connected to the engine for a vehicle, said transmission having a 1-2 shift valve, a 2-3 shift valve, and a lock-up clutch for coupling a turbine of the torque converter to a cover of the torque converter in a lock-up condition of the lock-up clutch, a turbine shaft being connected to the turbine, the lock-up clutch including a piston slidably mounted in the cover for actuating the lock-up clutch into the lock-up condition, a passage communicating a chamber defined by the piston and the cover, conduits connected to said shift valves, respectively, for applying pressure fluid therefrom to a band servo of a brake band of the transmission depending on respective speed side positions of said shift valves for providing a $D_1$ range, $D_2$-range and $D_3$-range, an oil pump operatively connected to said conduits via said shift valves, and a governor valve producing a governor pressure dependent on the vehicle speed, the improvement wherein
said lock-up clutch further includes,
a clutch disc supporting member being secured directly on a back side of said turbine,
a clutch disc adjacent said piston being supported axially slidably and non-rotatably on said clutch disc supporting member, and
a pressure plate being secured to said cover adjacent said clutch disc,
means comprising an oil pump drive shaft disposed in the turbine shaft for driving the oil pump,
said oil pump drive shaft forms therein a drive shaft passage which constitutes a part of said first-mentioned passage communicating with said chamber,
a control valve having a spool, constituting means for being shifted by said governor pressure, and having a port connected to one of said conduits for applying pressure fluid to said band servo and another port communicating with said first-mentioned passage including said drive shaft passage for said lock-up clutch,
an outlet of said 2-3 shift valve via said one of said conduits being connected to a release side of said band servo,
said control valve constituting means for communicating both said ports when said governor pressure exceeds a predetermined value for actuating said lock-up clutch in the lock-up condition via said pressure fluid when applied to said band servo from said one of said conduits,
said predetermined value of the governor corresponding to a vehicle speed at the $D_3$-range so as to apply the line pressure to the release side of said band servo, to provide a sufficient torque to enable driving of the vehicle in the lock-up condition of said lock-up clutch at the third speed side and further to provide reduction of the volume of the pressure oil chamber of the clutch and/or area of the clutch face subjected to the pressure oil, thereby decreasing the size and weight of the system.

* * * * *